Nov. 20, 1923.                                                1,474,772
                         J. P. FOSTER
              APPARATUS FOR THE MANUFACTURE OF ETHER
                   Filed Nov. 29, 1920        3 Sheets-Sheet 3
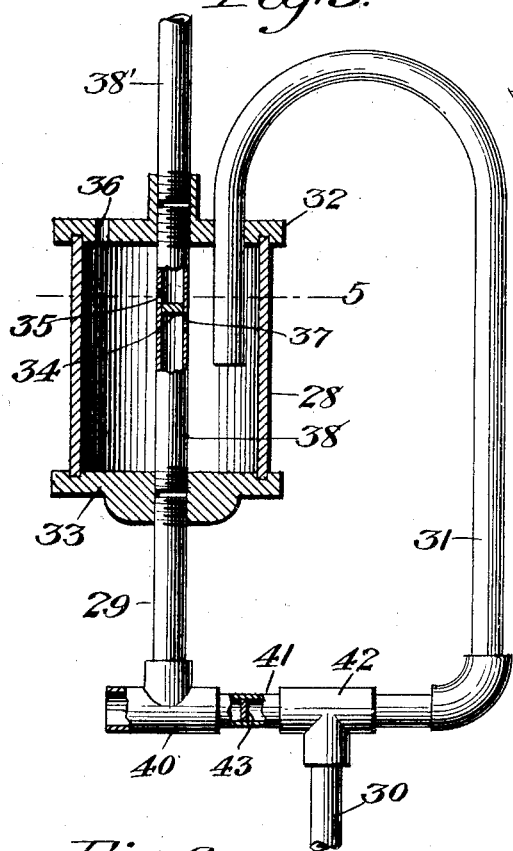
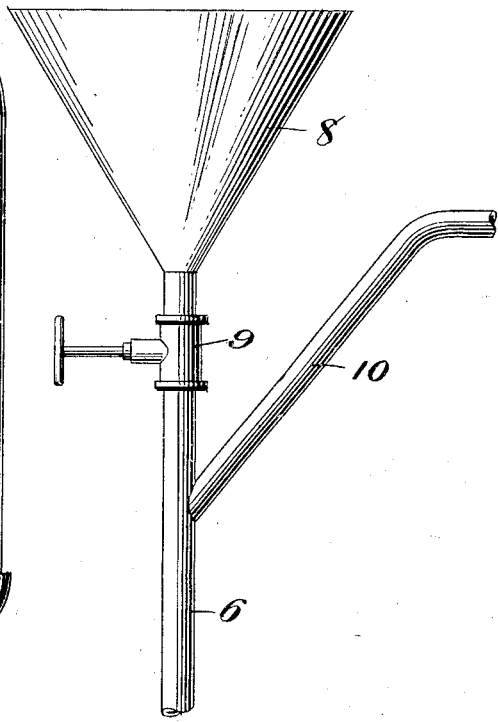
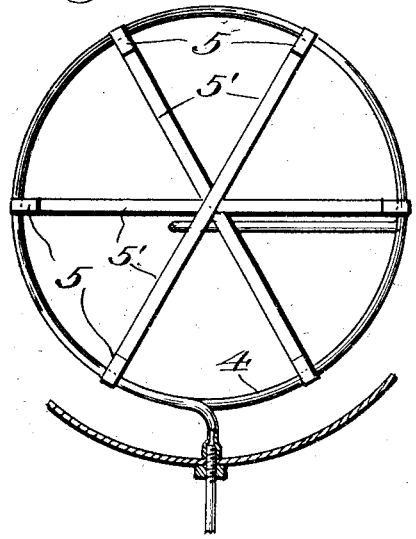
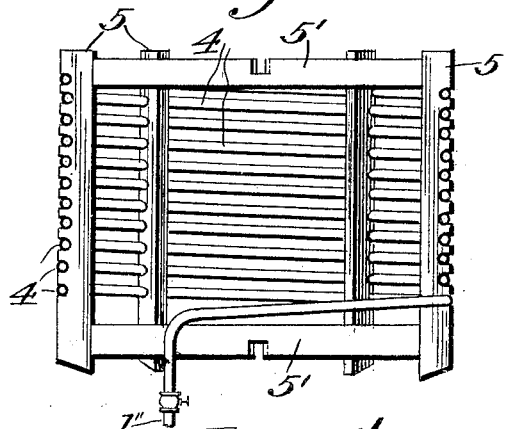
Inventor:
J. P. Foster.

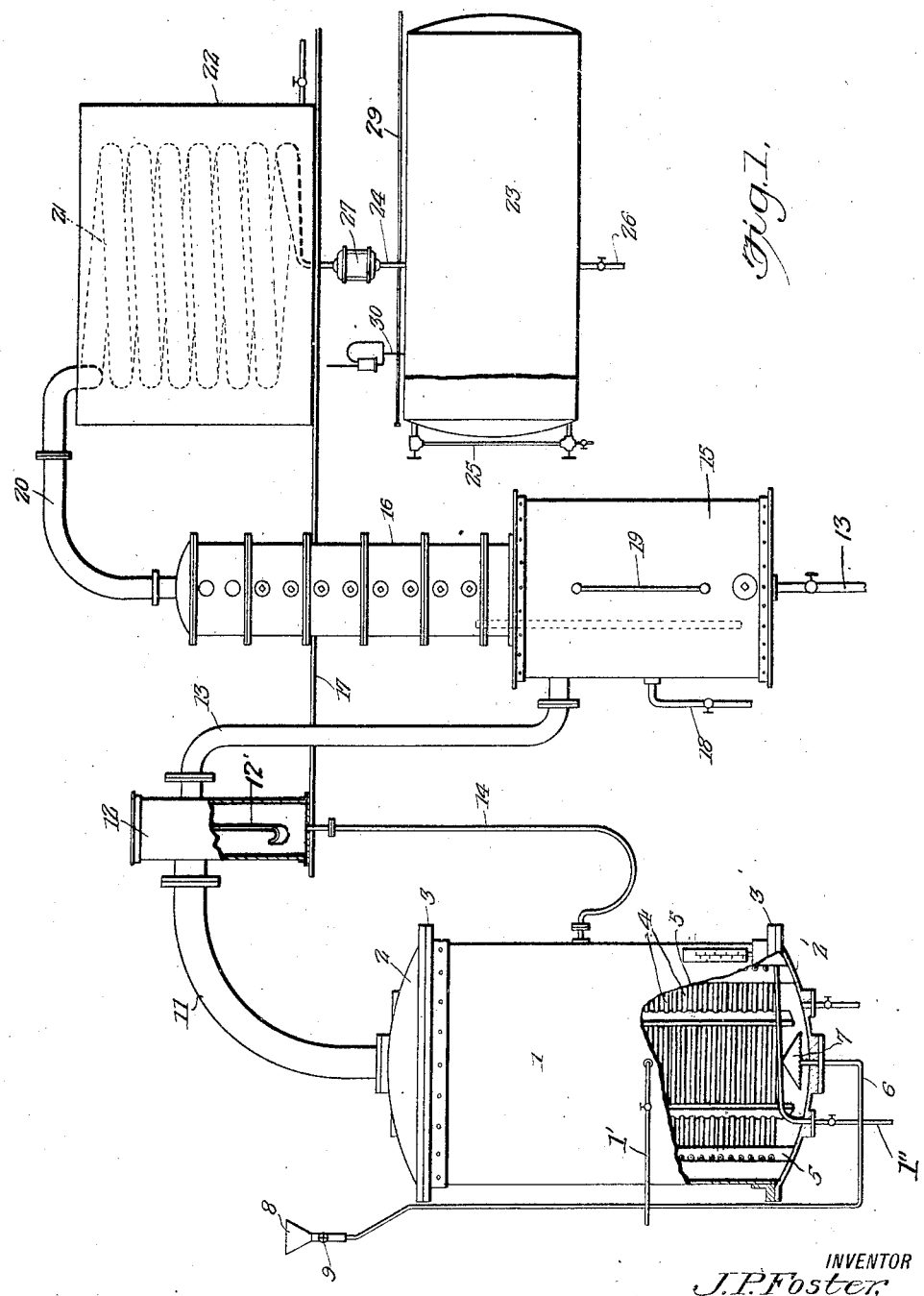

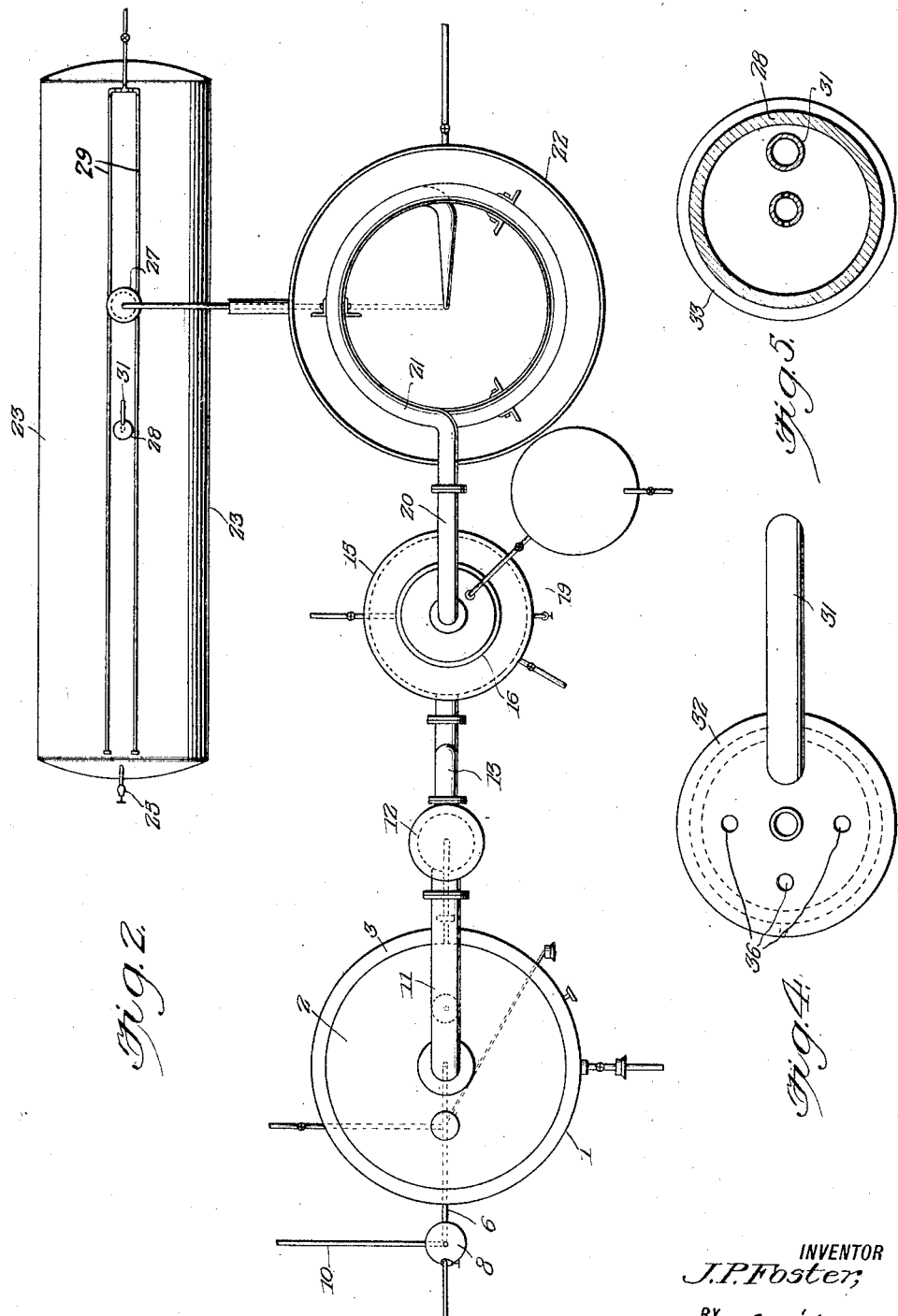

Patented Nov. 20, 1923.

1,474,772

UNITED STATES PATENT OFFICE.

JOHN PRESTON FOSTER, OF PAIA, TERRITORY OF HAWAII.

APPARATUS FOR THE MANUFACTURE OF ETHER.

Application filed November 29, 1920. Serial No. 427,202.

*To all whom it may concern:*

Be it known that I, JOHN P. FOSTER, a citizen of the United States, residing at and whose post-office address is Paia, Island of Maui, Territory of Hawaii, have invented certain new and useful Improvements in Apparatus for the Manufacture of Ether; and I do hereby declare the following to be a full, clear, and exact description of the invention, such as will enable others skilled in the art to which it appertains to make and use the same.

The invention relates to improvements in apparatus for the manufacture of ether by the acid process and has for its object to materially simplify and reduce the cost of construction and operation of the etherifier, more particularly in respect of the construction and arrangement of the steam coil for heating the same, to equip the etherifier with a safety device to prevent the mixture of sulphuric acid and alcohol being blown back through the feed pipe, by providing means for conducting any of the materials, which are so affected by the violent ebullition caused by the reaction of the sulphuric acid and alcohol, outside of the plant in which the apparatus is located; and further to provide a simple and efficient device for use, preferably in connection with the storage tank or ultimate receptacle for the ether produced, which will be effective to permit the escape of uncondensed gases, produced during the operation, and also serve to prevent the formation of a vacuum, or materially reduced pressure in the apparatus, by automatically admitting air to the apparatus as soon as the pressure therein is materially lowered due to the effects of condensation or other causes.

These and other objects of the invention will be more particularly set forth in the following description, which is predicated upon the accompanying drawings, in which;—

Fig. 1 is a more ar less diagrammatic elevation, partly in section, of the plant;

Fig. 2 is a plan view of the same;

Fig. 3 is an elevation, partly in section, of the breather or automatic safety vapor discharger and vacuum breaker;

Fig. 4 is a plan view of the same;

Fig. 5 is a horizontal section on line 5, 5 of Fig. 3;

Fig. 6 is an elevation of the outer end of the alcohol feed pipe and safety blow-off;

Fig. 7 is a sectional elevation of the steam coil and its support; and

Fig. 8 is a plan view of the same.

Referring to the drawings, 1 indicates the tank or receptacle constituting the body of the etherifier or still, which is closed by bottom and top heads 2, 2', removably secured to the body by any appropriate means. The body of the still, as thus constituted, is preferably formed of sheet steel or the like and lined with lead throughout.

Mounted within the tank 1 is a steam coil 4 having appropriate inlet and exhaust connections with the exterior of the vessel which admits of the coil being separated therefrom and being removed bodily from the vessel. It has been customary to mount the steam coils of etherifiers in the still by threading the coil through three or more perforated bars of cast lead and securing these bars to the bottom of the still by the usual lead burning operation, so that, when it became necessary to repair or replace the coil, the joints between the bars of the lead lining had to be broken, which would inevitably result in damaging the lining, and, furthermore, the repair of the coil, permanently mounted in the perforated lead bars, is not only difficult and expensive, but is frequently impossible of realization. In order to overcome these difficulties and to provide a coil which may be applied to or removed from the still, and also to reduce the difficulty and expense of repairing the coil, the latter is mounted upon a frame-work or reel-like device, comprising a series of longitudinal lead bars 5 secured together by an upper and lower series of cross bars 5', which cross bars are themselves secured together at their intersections, either by notching the engaging bars or welding the same together, or by both modes of fastening. In the form of construction shown, involving sets of three cross bars at top and bottom, two of the bars may be interlocked by notching them at their points of intersection and the third bar secured by a suitable weld or lead burning. The outer edges of the vertical bars 5 are notched at appropriate intervals to receive the successive convolutions of the coil 4, as clearly indicated in Figs. 1, 7 and 8. The lower ends of the upright bars 5 rest upon the bottom 2 of the still, so that, when the coil is disconnected from the inlet and exhaust steam pipes connected with the still, the coil and its supporting frame-work or reel may be lifted bodily from the still and a new coil substituted therefor, or the original coil quickly repaired and replaced. Inasmuch as the coil 4 of the lead pipe is wound on the supporting frame or reel with the convolutions loosely engaging the recesses in the vertical members 5 of the frame, it will be apparent that the coil, if necessary, may be readily disengaged from its supporting frame and properly repaired or a new coil substituted therefor, after which the coil and its support may be quickly restored to its position within the vessel and the connections made with the steam supply pipe 1' and the exhaust pipe 1".

The pipe 6 for supplying alcohol to the still enters through the lower head 2, and is provided with a suitable conical distributor hood 7 which serves to diffuse the alcohol throughout the body of sulphuric acid in which the coil 4 is submerged. The upper end of the supply pipe 6 is provided with a suitable funnel 8, below which is a shut-off valve 9. In the initial charging of alcohol into the still containing sulphuric acid, to produce the ether, it not infrequently happens that the violent reaction which takes place effects a belching or discharging of the boiling sulphuric acid back through the feed pipe, thereby greatly endangering the operators and the plant. To obviate this difficulty a safety blow-off is provided in the form of a pipe or conduit 10, preferably connected with the feed pipe 6 below the valve 9 therein, which pipe 10 is preferably continued outside of the building where any of the dangerous contents of the still, which may be blown backward, may be discharged without danger or damage. After the still has been charged and before the steam is turned on, the valve 9 is closed, and any discharge which may take place will be safely conducted outside of the building. After the first violent reaction subsides and the evolution of ether is proceeding smoothly, the valve 9 is opened and a continuous feed of alcohol is started into the funnel and the operation of the still becomes safe and practically automatic.

Connected with the top of the top head 2 is a vapor pipe or conduit 11 which delivers the vapors from the still into a save-all 12, which is provided with a central baffle 12', wherein any liquid particles of sulphuric acid or alcohol are caught and returned to the still through a suitable drain pipe 14. The gases and vapors entering the save-all from the conduit 11 impinge on the baffle and are arrested and deflected in their course to the exit pipe 13. This causes the deposition of the entrained liquid particles in the save-all, from which the collected liquid is returned to the still by the drain pipe 14. The vapors passing through the save-all are conducted by a pipe 13 and delivered to a scrubber of any suitable character, where said vapors are caused to bubble through an alkaline solution, which neutralizes the acid in the vapors, so that the latter, consisting of relatively pure ether, are ultimately delivered from the scrubber. As shown, the scrubber involves a lower reservoir section 15 provided with a lateral bleeder pipe 18 and a bottom washout pipe 13, both equipped with suitable valves. Above the lower reservoir section 15 is mounted a series of sections 16 which constitute trays containing a solution of alkali, preferably caustic soda, through which the vapors are caused to pass successively, where they are freed from the acid reaction and are ultimately delivered through a discharge pipe 20, which is in turn connected with a condenser worm 21, mounted in a cooling tank 22 containing water or other cooling liquid.

To the lower end of the condenser worm 21 is connected a discharge pipe 24 having therein a sight glass 27 which admits of the character of the condensation product being observed. The storage tank 23 is provided with a sight gauge 25 and a valved discharge pipe 26. If desired, a system of sprinkler pipes 29 may be located above the storage tank 23 to spray the latter with water and maintain the desired low temperature in said tank.

In the operation of an etherifying plant of the character described it is practically impossible to prevent some non-condensible gases or vapors passing over with the ether vapors and entering the storage tank. In order to get rid of these undesirable gases and vapors and also to provide means for preventing the formation of a vacuum in the storage tank and the connected apparatus, a so-called breather is connected to the upper portion of the storage tank 23 by means of a vent pipe 30. The breather, which is illustrated in detail in Figs. 3, 4 and 5, comprises a cylindrical casing 28, which may, if desired, be made of glass or other suitable material, having a top 32 and a bottom 33, which are secured together by a pipe section 38, which serves to lock the top and bottom members 32 and 33 securely to the body portion 28. Said pipe 38 is provided with a plug 34 of lead or the like which is interposed between an inlet opening 35 and an outlet opening 37 in the pipe 38, the former serving to admit water in suitable quantities to the casing 28 through a supply pipe 38' connected to the top member 32 and in communication with the pipe 38; the latter opening 37 serving as an overflow to regulate the depth of the water in the casing. The vent pipe 30 is connected with a gooseneck pipe 31 which passes through the top 32 of the casing and the lower end of which dips into the water in the casing below the level established by the overflow outlet 37. A suitable drain pipe 29 is connected with the bottom 33 of the casing 28 and is in open communication with the lower end of the pipe 38 and serves to discharge any surplus water from the casing. In order to support the casing 28 and its appurtenant elements the drain pipe 29 is preferably connected by a coupling 40 and a short pipe section 41 with a T-head 42, which latter connects the vent pipe 30 with the gooseneck 31. In order to break communication between the vent pipe 30 and the discharge coupling on the end of pipe 29, a plug 43 of lead or the like is inserted in the short pipe section 41.

The operation of the breather is as follows. When any non-condensible gases enter the storage tank 23 along with the condensed ether and establish a pressure in the tank sufficient to overcome the water seal at the discharge end of the gooseneck 31, the gases pass freely out of the vent pipe 30 by way of the gooseneck 31 into the casing 28, whence they escape to the atmosphere through suitable openings 36 in the cap 32 of the casing. The breather also serves an important function as an automatic vacuum breaker for the storage tank and the associated apparatus. In case of sudden cooling of the apparatus, due to the failure of the steam supply, or any other cause, the very rapid condensation of the ether vapors in the apparatus will result in the formation of a high vacuum with attendant danger to the apparatus. As soon as a relatively small reduction of pressure in the receiver or storage tank 23 takes place, the water, which forms the seal in the casing 28 of the breather, is immediately drawn into the receiver and air admitted through the opening 36, thence, by the pipes 31 and 30, into the tank 23 and connected apparatus, immediately breaking the vacuum and eliminating any danger of collapse in any part of the apparatus.

From the foregoing description it will be apparent that the etherifying plant is, as contradistinguished from the ordinary plant for this general purpose, extremely simple and inexpensive both as to its construction and mode of operation, involving as it does a coordination of parts or elements which may be assembled and repaired by workmen having no particularly high degree of skill or experience, and which when so assembled may be operated at a minimum cost and without the attendant dangers peculiar to this general type of apparatus, such as have hereinbefore been referred to.

What I claim is:

1. In an apparatus for the manufacture of ether, the combination with a still having a conduit leading therefrom for the transmission of gases, of a save-all interposed in said conduit to arrest the flow of the gases for the deposition of the entrained liquid particles, and a drain pipe leading from the save-all back to the still to return to the latter the liquid collected in the save-all.

2. In an apparatus for the manufacture of ether, the combination with a still having a conduit leading therefrom for the transmission of gases, of a save-all interposed in said conduit, a baffle in the save-all operating to arrest and to deflect the gases for the deposition of the entrained liquid particles, and a drain pipe leading from the save-all to carry off the liquid collected therein.

3. In an apparatus for the manufacture of ether, a still, a supply pipe for feeding the liquid to the bottom of the still, and means connected with the supply pipe for diverting matter blown back from the still to a distance from the latter, a scrubber, a condenser, and a receiving tank connected in sequence, a save-all interposed between the still and the scrubber, and connections with the save-all and the still for delivering liquid, retained by the save-all, back to the still.

4. In an apparatus for the manufacture of ether, means for feeding the still comprising a pipe extending from the bottom of said still to a point above the top thereof, a discharge pipe connected below the top of the feed pipe, leading to a distance from the still, and a valve between the top of said feed pipe and the discharge pipe connection, a scrubber, a condenser, and a receiving tank connected in sequence, a save-all interposed between the still and the scrubber, and connections between the save-all and still for delivering liquid, retained by the save-all, back to the still.

5. In an apparatus for the manufacture of ether, a still, means for feeding the still comprising a pipe extending from the bottom of said still to a point above the top thereof, and having a funnel at its top, a discharge pipe below the funnel leading to a distance from the still, and a valve in the feed pipe between the funnel and the discharge pipe connection, a scrubber, a condenser coil and a receiving tank connected in sequence, a save-all interposed between the still and the scrubber, and connections between the save-all and the still for delivering liquid, retained by the save-all, back to the still.

6. In an apparatus for the manufacture of ether, the combination with a still having a conduit leading therefrom for the transmission of gases, of a save-all interposed in said conduit, a baffle in the save-all operating to arrest and to deflect the gases for the deposition of the entrained liquid particles, and a drain pipe leading from the save-all back to the still to return to the latter the liquid collected in the save-all.

7. In an apparatus for the manufacture of ether, the combination of a still having an element communicating therewith to receive the gases generated in said still, with a breather communicating with said element and operating to permit the escape therefrom of non-condensable gases or to admit outside air to prevent the formation of a vacuum therein.

In testimony whereof I affix my signature.

JOHN PRESTON FOSTER.